(12) United States Patent
Evans et al.

(10) Patent No.: US 8,528,383 B2
(45) Date of Patent: Sep. 10, 2013

(54) PRESSURE SENSOR USING GAS/LIQUID INTERFACE

(75) Inventors: Allan T. Evans, Richland, WA (US);
Jonathan D. Suter, Richland, WA (US);
Jacob M. Fricke, Pasco, WA (US);
Rebecca L. Erikson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 235 days.

(21) Appl. No.: 13/270,114

(22) Filed: Oct. 10, 2011

(65) Prior Publication Data

US 2013/0086988 A1    Apr. 11, 2013

(51) Int. Cl.
*G01N 7/00*     (2006.01)
*G01N 9/00*     (2006.01)
*G01N 19/00*    (2006.01)

(52) U.S. Cl.
USPC ................... 73/23.2; 73/23.27; 73/23.29

(58) Field of Classification Search
USPC .................................. 73/700–756
See application file for complete search history.

(56) References Cited

U.S. PATENT DOCUMENTS

| | | | |
|---|---|---|---|
| 3,103,821 | A | 9/1963 | Wright |
| 4,837,777 | A | 6/1989 | Jones et al. |
| 7,784,495 | B2 | 8/2010 | Prakash et al. |
| 2007/0125178 | A1 | 6/2007 | Rosenau et al. |
| 2010/0103399 | A1* | 4/2010 | Lyons et al. ............ 355/71 |
| 2013/0139602 | A1* | 6/2013 | Geipel ............ 73/700 |

OTHER PUBLICATIONS

Srivastava, N., et al., Microfluidic Pressure Sensing Using Trapped Air Compression, Lab Chip, 2007, 7, 633-637.
International Search Report/Written Opinion for International Application No. PCT/US2011/058834, International filing date Nov. 1, 2011, Date of mailing Apr. 12, 2012.

* cited by examiner

*Primary Examiner* — Andre Allen
(74) *Attorney, Agent, or Firm* — A. J. Gokcek

(57) ABSTRACT

A pressure sensor and method of sensing pressure is disclosed. An fluid port is coupled to a substrate. A first microchannel within the substrate is in fluid communication with the fluid port. The first microchannel includes a first compressible fluid, a first incompressible fluid and at least one first meniscus. A second microchannel within the substrate is in fluid communication with the fluid port. The second microchannel includes a second compressible fluid, a second incompressible fluid and at least one second meniscus. A pressure of the first meniscus and/or the second meniscus is determined.

46 Claims, 9 Drawing Sheets

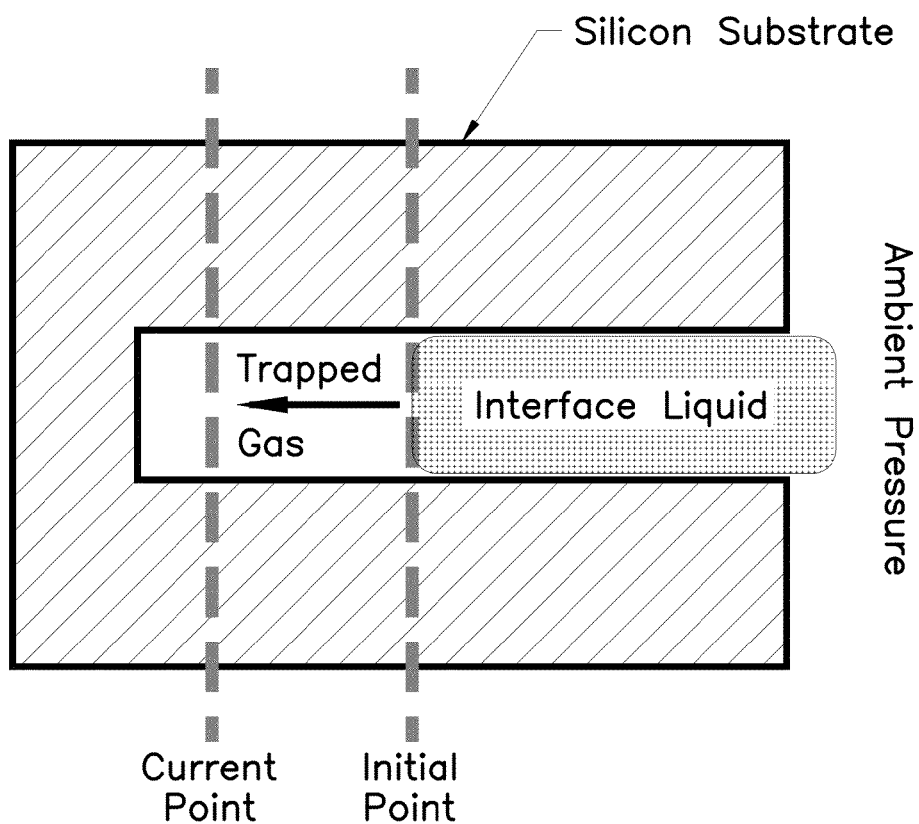
Figure #1

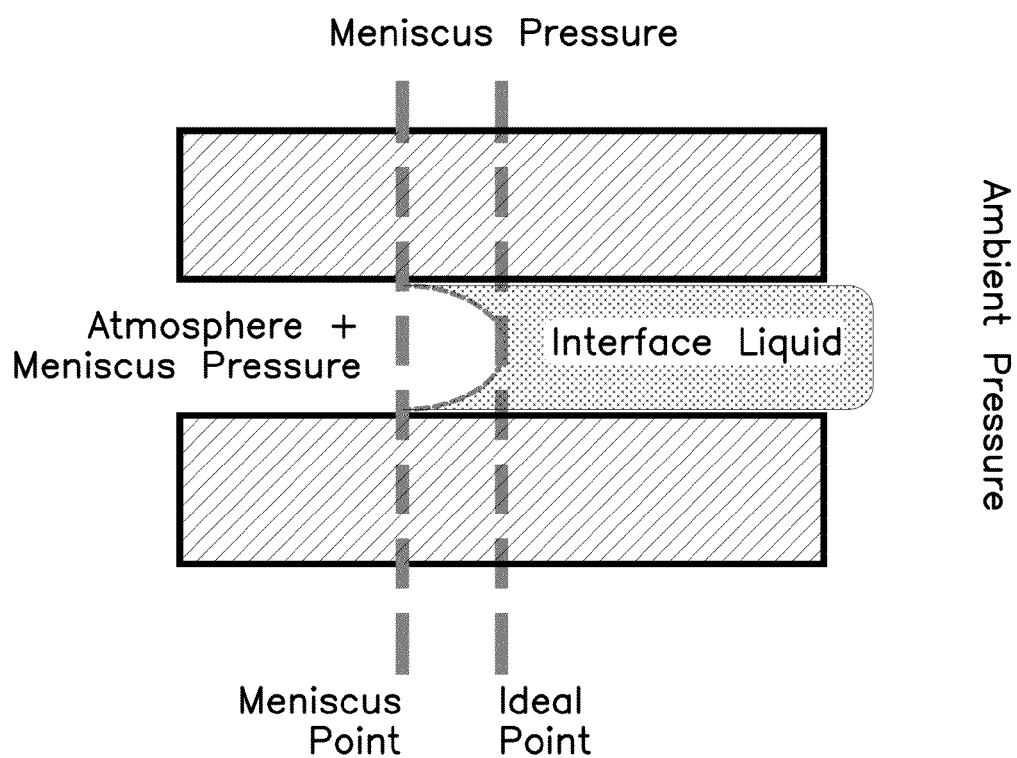
Figure #2

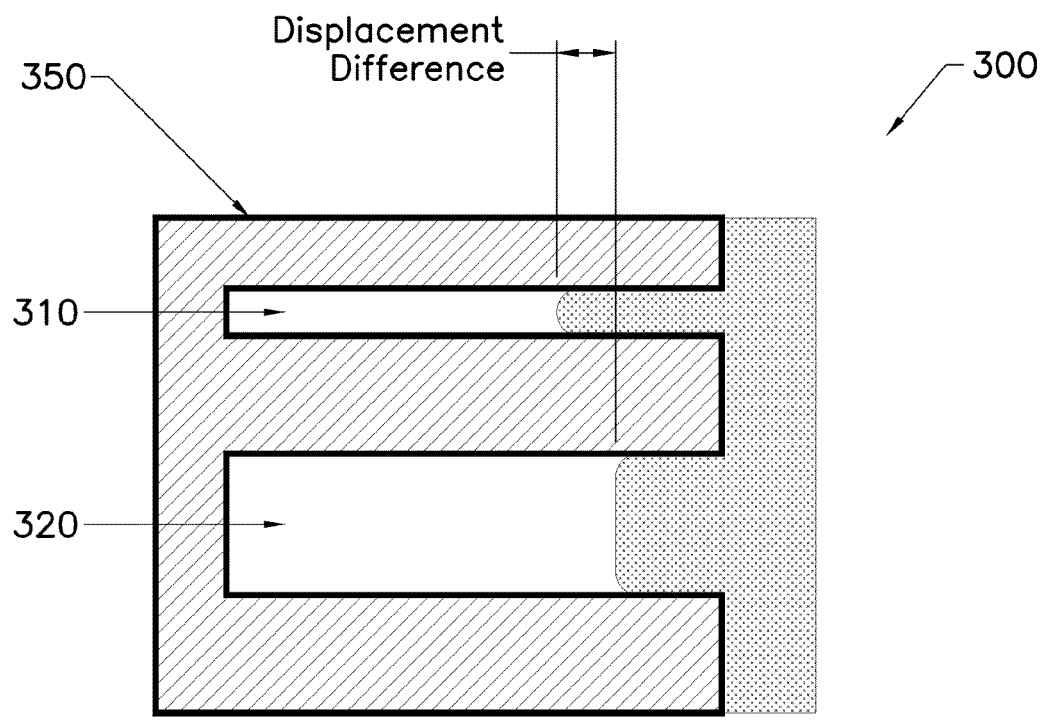
Figure #3

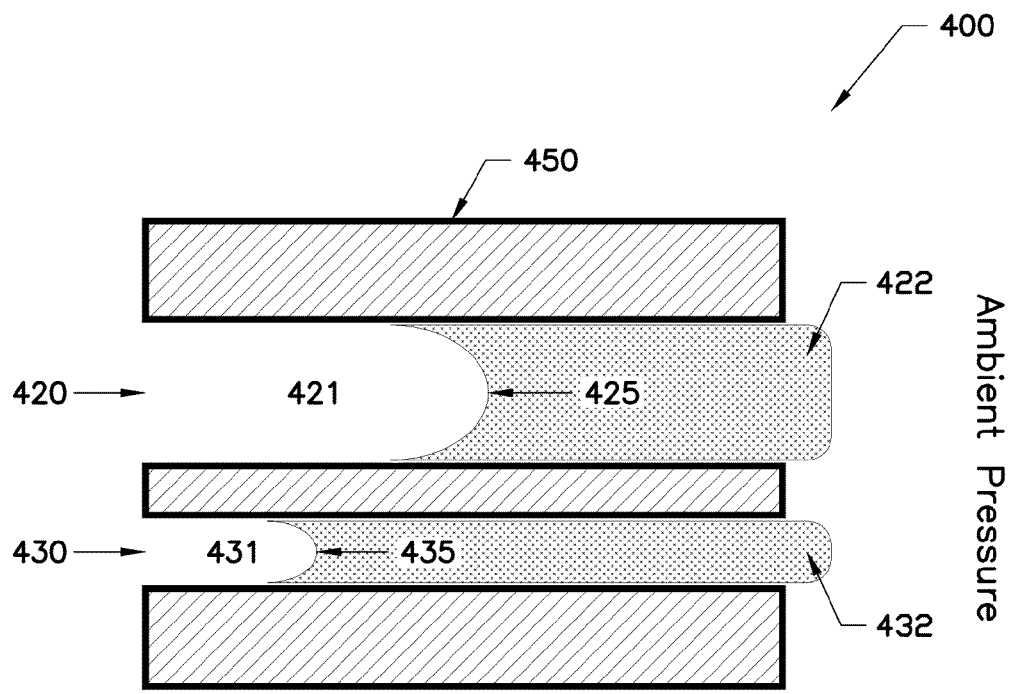
Figure #4

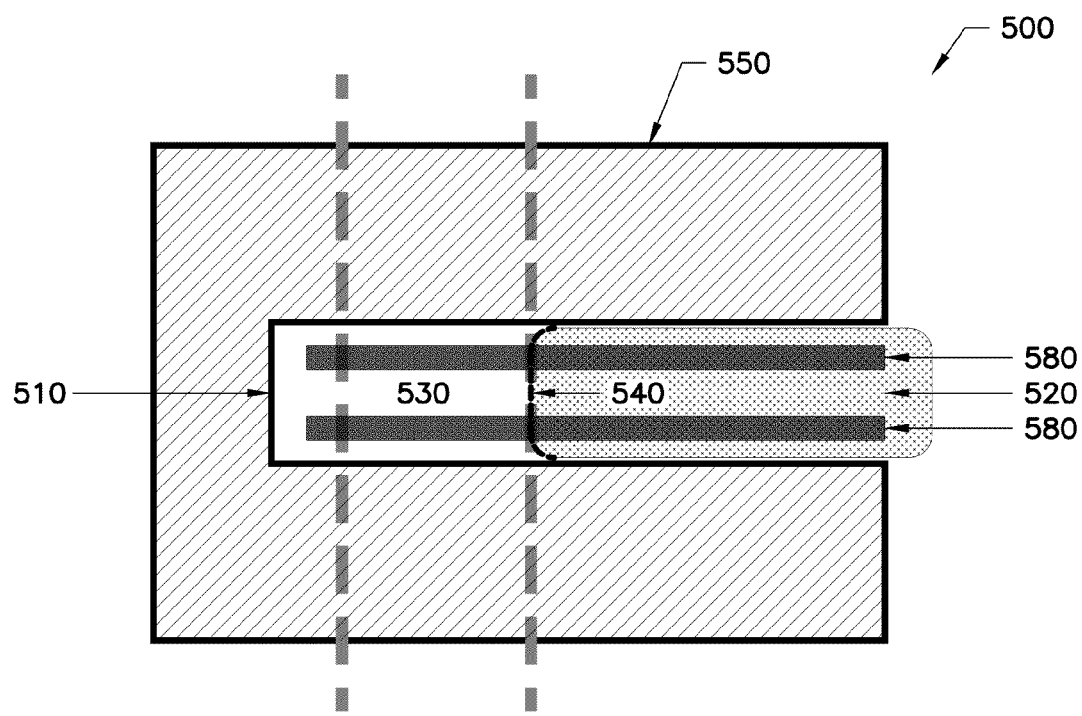
Figure #5

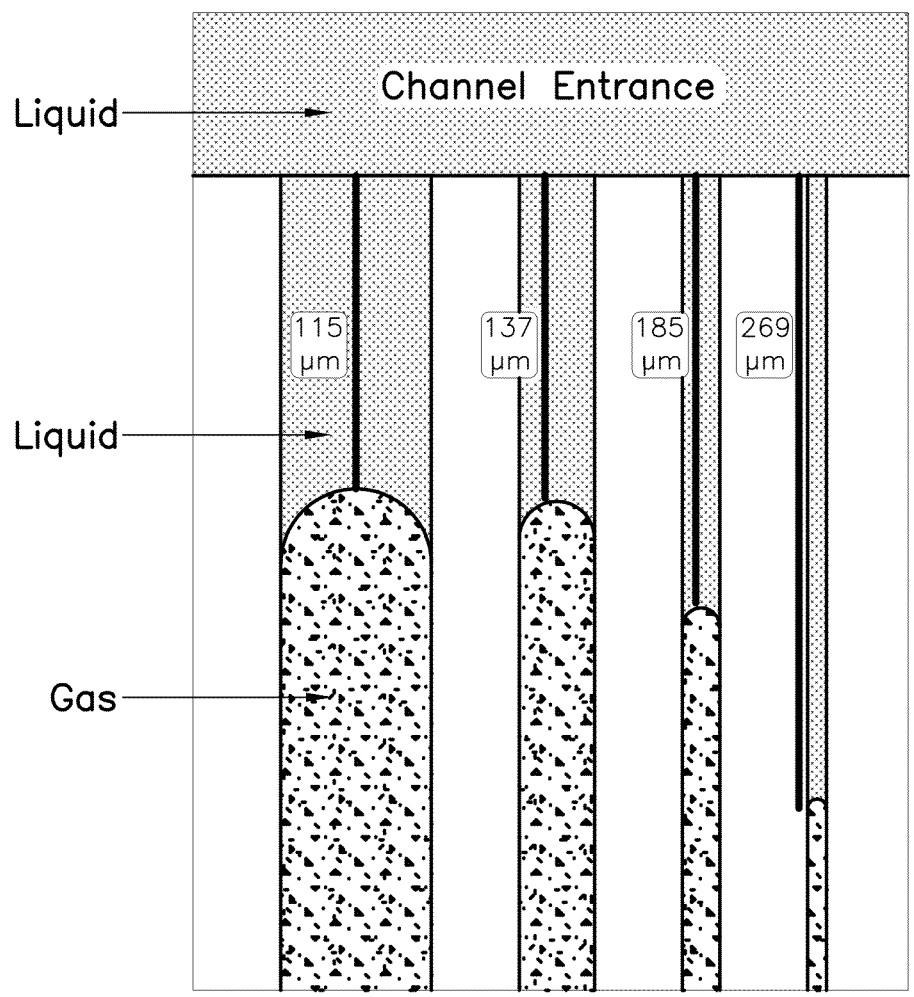
Figure #6

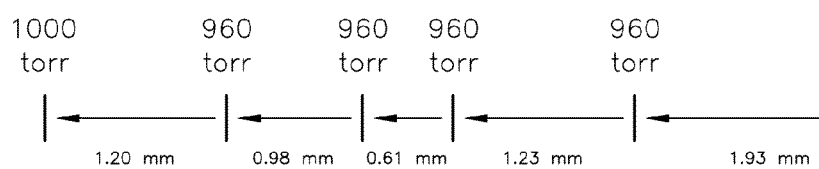
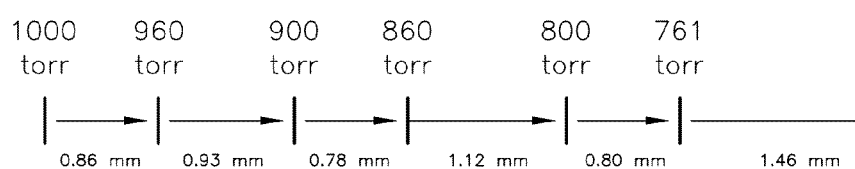
Figure #7

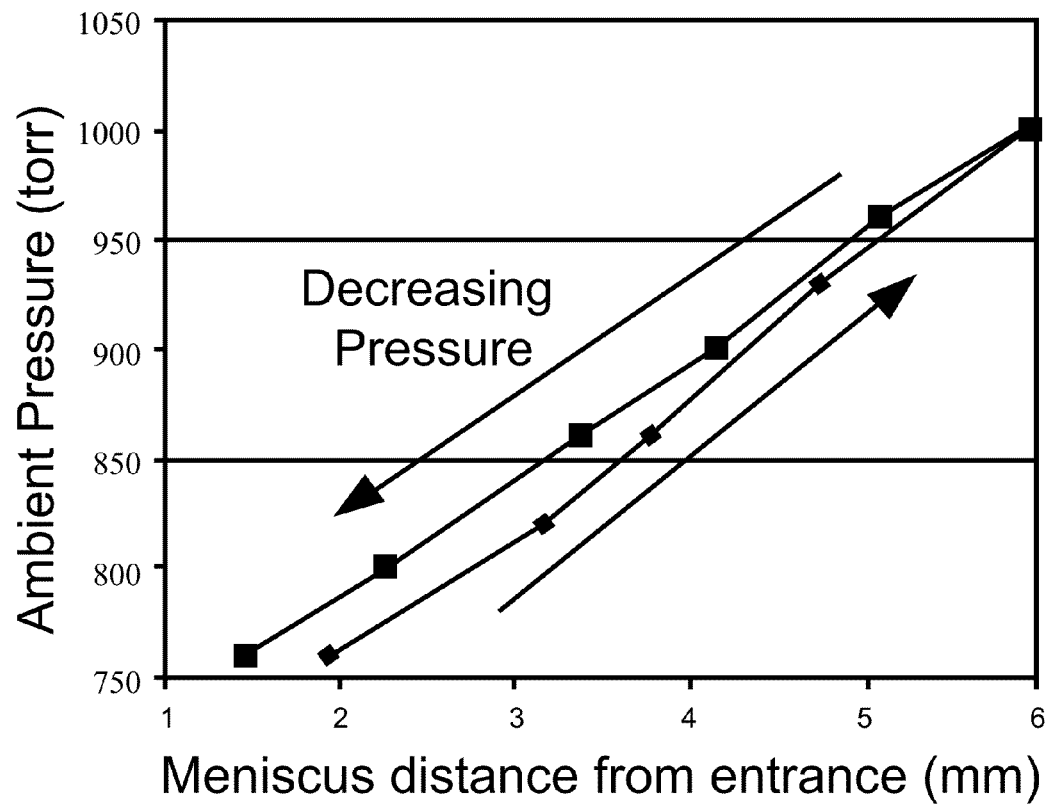
Figure #8A

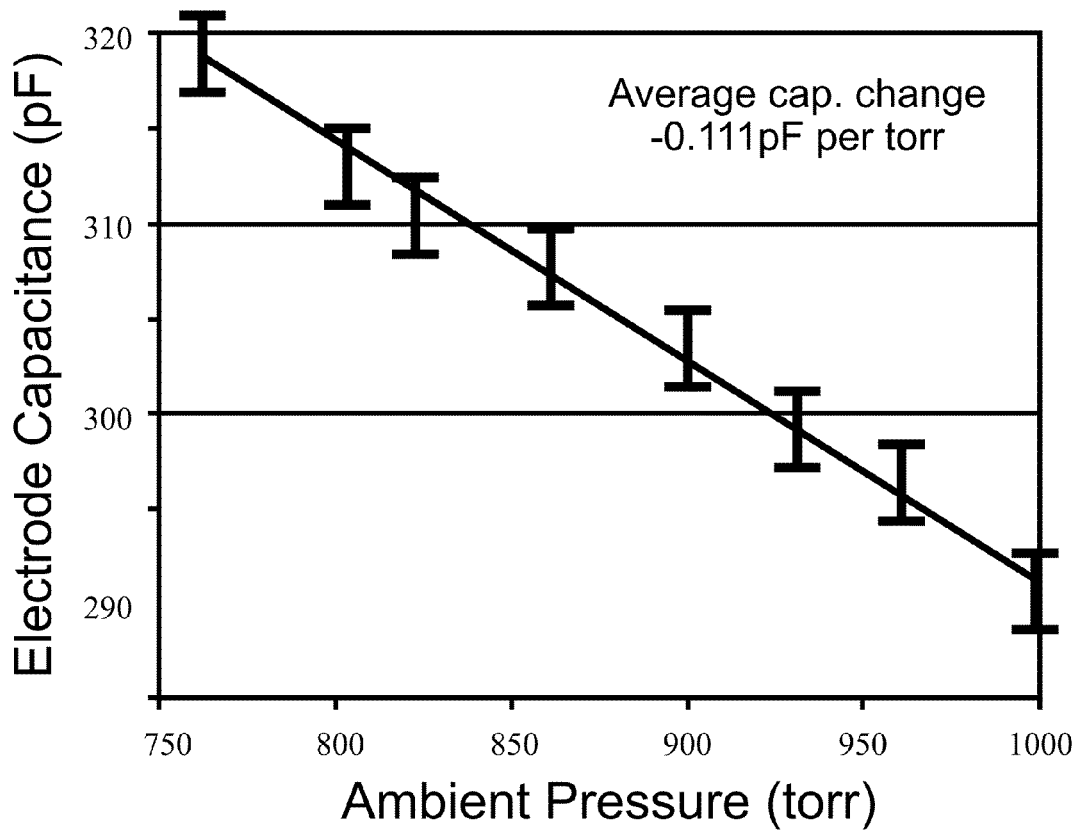
Figure #8B

PRESSURE SENSOR USING GAS/LIQUID INTERFACE

TECHNICAL FIELD

This invention relates to pressure sensors. More specifically, this invention relates to a pressure sensor and method of measuring pressure by measuring position changes of an interface between a compressible and incompressible fluid.

BACKGROUND OF THE INVENTION

Traditional silicon-based pressure sensors have reached maturity and are widely commercially available. They are generally limited to operation at temperatures of less than 200° C. due to technical limitations. Current technological improvements have yielded traditional sensors that can operate in temperatures of up to 500° C. and at pressures up to 50 MPa. Additionally, very few commercial units have been demonstrated to work in the body without foreign body response causing critical drift errors. There has also been no demonstration of micromachined pressure sensors that can sustain operation in long term caustic and radioactive environments such as those commonly found in the nuclear fuel cycle.

A typical interface-type sensor is shown in FIG. 1. A closed channel with liquid at the inlet forms a gas/liquid interface inside the channel. The channel is within a substrate and in fluid communication with the inlet. The volume of the gas in the channel is directly related to the pressure outside of the device due to hydraulic compression from the liquid. This relationship is approximately defined by the Van der Waals equation:
P V=N κ T where P=pressure, V=volume, N=number of particles in the gas, κ=Boltzmann's constant, and T=temperature. The distance that the liquid is driven in (or out) of the channel is directly related to the pressure and temperature of the environment by the gas laws.

The device is initially "primed" at a fixed gas pressure ($P_o$), temperature ($T_o$) and has an initial volume ($V_o$). A volume measurement is taken by one of several means (optically, capacitive, digitally, etc.) and the current pressure $P_g$ is determined from the relative gas law equation (this equation can be modified to account for elements of Van der Waals equation if greater accuracy is required):

$$P_g = P_o \left(\frac{V_o}{V_g}\right)\left(\frac{T_g}{T_o}\right)$$

By measuring volume, the pressure in the channel can be calculated. Then, the pressure outside of the substrate can be determined.

These laws work well with large channels where only the ambient pressure is of concern. FIG. 2 shows a small channel—a microchannel with a diameter of less than about 200 micrometers—within a substrate and having a liquid/gas interface. The FIG. 2 shows an atmospheric pressure from the inlet (or outlet) port to just prior to the meniscus curve, and a meniscus pressure from an "Ideal Point" to the "Meniscus Point". This results in a measured pressure that is equal to the combination of the atmospheric pressure and the meniscus pressure.

The first deviation from operations governed by the previous equations is a pressure barrier that a meniscus creates inside the microchannel. There can be both advancing and receding meniscus' that sustain pressure drops, which creates hysteresis and measurement error. The capillary pressure ($P_{cap}$) created by a meniscus is given by a variant of the Young-Laplace equation:

$$P_{cap} = 2\sigma \cos\theta \left(\frac{1}{h_c} + \frac{1}{w_c}\right)$$

where σ is the surface tension of the liquid and θ is the contact angle of the liquid on the surface. This yields a final measured pressure $P_{meas}$ that is related to the gas pressure $P_g$ and the capillary pressure:

$$P_{meas} = P_g - 2\sigma(\cos\theta)\left(\frac{1}{h_c} + \frac{1}{w_c}\right)$$

The meniscus effect can limit the minimum detectable resolution of an oscillating pressure because the meniscus changes from an advancing contact angle to a receding contact angle when pressure changes cause the liquid to change from moving forward in the channel to receding and vice versa. A worst case scenario for this pressure resolution would be the combination of the values of the capillary (microchannel) pressure for both advancing and receding contact angles.

What is needed is a pressure sensor for a microchannel substrate apparatus that measures and cancels out of the final pressure measurement the meniscus pressure.

SUMMARY OF THE INVENTION

The present invention is directed to a pressure sensor and a method of sensing pressure. In one embodiment of the present invention, a pressure sensor is disclosed. The sensor comprises a substrate and a fluid port coupled to the substrate. The sensor also includes a first microchannel within the substrate in fluid communication with the fluid port. The first microchannel includes a first compressible fluid, a first incompressible fluid, and at least one first meniscus (or fluid interface). The sensor further includes a second microchannel within the substrate in fluid communication with the fluid port. The second microchannel includes a second compressible fluid, a second incompressible fluid and at least one second meniscus. A pressure of at least one of the first meniscus and the second meniscus is determined.

In one embodiment, a cross-sectional dimension of the microchannels does not exceed 200 micrometers. In one embodiment, the microchannels differ in at least one of a cross-sectional area and length that allow for determination of meniscus pressure. As one example, the width of the first microchannel is approximately half its height and the width of the second microchannel is approximately twice its height.

In one embodiment, the sensor further includes at least one electrode. The at least one electrode can be implemented in a capacitive, inductive or resistive fashion to determine the displacement of a gas/liquid interface. The at least one electrode can be an analog electrode or a digital electrode. In one embodiment, the at least one electrode measures a volume of gas in each of the microchannels. In an alternative embodiment, the sensor can further comprise a non-electrical mechanism to measurement displacement of a gas/liquid interface. The non-electrical mechanism can be optical, acoustic or vibratory. In one embodiment, the sensor is embedded in a cerebrospinal fluid (CSF), a deep well, an automotive tire, or a component of another MEMS device.

The sensor can also include a plurality of microchannels within the substrate. Each of the plurality of microchannels is in fluid communication with the fluid port and wherein the plurality of microchannels differ in at least one of a cross-sectional area and channel length. In one embodiment, the plurality of microchannels comprise branching or bifurcating microchannels. Also, each microchannel has at least one meniscus at a gas/liquid interface, and a pressure of the at least one meniscus of the plurality of microchannels is determined.

In one embodiment, the sensor further comprises a temperature sensor in coordination with the pressure sensor to more accurately determine the pressure of at least one of the first and second meniscus. In one embodiment, the sensor is primed with any fluids at any pressure to operate in a variety of atmospheric conditions.

In another embodiment of the present invention, a method of sensing pressure is disclosed. The method comprises providing a substrate and coupling a fluid port to the substrate. The method further includes forming a first microchannel within the substrate, wherein the first microchannel is in fluid communication with the fluid port. The first microchannel includes a first compressible fluid, a first incompressible fluid and at least one first meniscus. The method also includes forming a second microchannel within the substrate, wherein the second microchannel is in fluid communication with the fluid port. The second microchannel includes a second compressible fluid, a second incompressible fluid and at least one second meniscus. The method also includes determining a pressure of at least one of the first meniscus and the second meniscus.

In another embodiment of the present invention, a pressure sensor is disclosed. The sensor comprises a substrate and a fluid port coupled to the substrate. The sensor also includes a channel within the substrate in fluid communication with the fluid port. The channel includes a compressible fluid, an incompressible fluid and at least one meniscus which forms a gas/liquid interface in the channel. The sensor also includes a device for measuring a displacement of the interface. The device can be an electrode or a non-electrical mechanism for measuring displacement of the interface. The non-electrical mechanism can be optical, acoustic or vibratory.

In one embodiment, the sensor further includes a plurality of channels within the substrate, wherein each of the plurality of channels is in fluid communication with the fluid port. Each of the plurality of channels includes a compressible fluid, an incompressible fluid and at least one meniscus which forms a gas/liquid interface in each of the plurality of channels. The meniscus moves due to pressure change, temperature change, or acceleration.

In another embodiment of the present invention, a method of sensing pressure is disclosed. The method comprises providing a substrate and coupling a fluid port to the substrate. The method also includes forming a channel within the substrate. The channel is in fluid communication with the fluid port and includes a compressible fluid, an incompressible fluid and at least one meniscus which forms a gas/liquid interface in the channel. The method further comprises measuring a displacement of the interface.

BRIEF DESCRIPTION OF THE DRAWINGS

FIG. 1 is an illustration of a prior art pressure sensor.
FIG. 2 is an illustration of a prior art pressure sensor.

FIG. 3 is a diagram of two microchannels of a pressure sensor that differ in width to illustrate how the meniscus pressure due to varying geometries creates a displacement difference between the channels, in accordance with one embodiment of the present invention.

FIG. 4 is a diagram of a pressure sensor, in accordance with another embodiment of the present invention.

FIG. 5 is a diagram of a pressure sensor, in accordance with another embodiment of the present invention.

FIG. 6 is a diagram of four microchannels having different widths in operation with water introduced at 761 torr, in accordance with another embodiment of the present invention.

FIG. 7 shows capacitive measurements taken by four electrodes of the meniscus location for increasing and decreasing ambient pressures.

FIG. 8A shows the results for ambient pressure (torr) of increasing and decreasing ambient pressures at different meniscus locations from the entrance of the microchannel.

FIG. 8B shows electrode capacitance measurements at increasing and decreasing ambient pressures.

DETAILED DESCRIPTION OF THE PREFERRED EMBODIMENTS

FIG. 3 is a diagram of a pressure sensor 300 including a first microchannel 310 and a second microchannel 320 that differ only in width, in accordance with one embodiment of the present invention. The first and second microchannels 310 and 320 are within a substrate 350. A meniscus pressure due to varying geometries creates a displacement difference between the microchannels 310 and 320. The measured pressure in microchannel 1 ($P_1$) is equal to the liquid pressure ($P_{meas}$) and the capillary pressure ($P_{c1}$). The measured pressure in channel 2 ($P_2$) is due to the same liquid pressure (Pmeas), but a different capillary pressure ($P_{c2}$). The displacement difference will cause a difference in the measured gas pressures (or interface positions) of the first and second microchannels 310 and 320 ($P_{g1}$ and $P_{g2}$, respectively). As an example, if the width of first microchannel 310 is half of the microchannel height, and the width of the second microchannel 320 is twice the microchannel height, the capillary pressure of the first microchannel 310 will be twice the capillary pressure of the second microchannel 320. This provides an exact formula: $P_{cap1}=2(P_{g1}-P_{g2})$ & $P_{cap2}=P_{g1}-P_{g2}$ to determine the capillary pressure of the first microchannel 310 and the second microchannel 320 without requiring calibration or information about the contact angles or surface tension forces of the materials involved. These values can be stored and then used to calculate the actual measured pressure for both advancing and receding liquids.

FIG. 4 is a diagram of a pressure sensor 400, in accordance with another embodiment of the present invention. The pressure sensor 400 includes a substrate 450, and a fluid port (not shown) coupled to the substrate 450. The pressure sensor 400 includes a first microchannel 420 within the substrate 450 in fluid communication with the fluid port. The first microchannel 420 includes a first compressible fluid 421, a first incompressible fluid 422 and at least one first meniscus 425. The pressure sensor 400 also includes a second microchannel 430 within the substrate 450 in fluid communication with the fluid port. The second microchannel 430 includes a second compressible fluid 431, a second incompressible fluid 432 and at least one second meniscus 435. The pressure in the first microchannel 420 consists of the outside (ambient) pressure and the pressure of the first meniscus 425. The pressure in the second microchannel 430 consists of the outside (ambient)

pressure and the pressure of the second meniscus 435. The microchannels differ in either a cross-sectional area or length that allow for determination of meniscus pressure. The pressure sensor 400 determines a pressure of at least one of the first meniscus 425 and the second meniscus 435 using electrical or non-electrical mechanisms. Then, by subtracting or cancelling out the meniscus pressures from each other, the outside or ambient pressure can be determined.

In one embodiment, the pressure sensor 400 includes an electrode (not shown). The electrode is implemented in a capacitive, inductive or resistive fashion to determine the displacement of a gas/liquid interface. The electrode can be an analog electrode or a digital electrode. The non-electrical mechanism, which measures displacement of the gas/liquid interface, can be optical, acoustic or vibratory.

In one embodiment, the pressure sensor 400 includes a plurality of microchannels within the substrate 450, wherein each of the plurality of microchannels is in fluid communication with the fluid port. The plurality of microchannels differ in either a cross-sectional area or channel length. The microchannels can include branching or bifurcating microchannels. Each of the plurality of microchannels has at least one meniscus at a gas/liquid interface. The pressure of the at least one meniscus is determined.

In one embodiment, the pressure sensor 400 further includes a temperature sensor in coordination with the pressure sensor 400 to more accurately determine the pressure of either the first or second meniscus. Also, the pressure sensor 400 can be primed with any fluids at any pressure in a variety of atmospheric conditions.

FIG. 5 is a diagram of a pressure sensor 500, in accordance with another embodiment of the present invention. The pressure sensor 500 includes a substrate 550 and a fluid port (not shown) coupled to the substrate 550. The pressure sensor 500 also includes a channel 510 within the substrate 550 in fluid communication with the fluid port. The channel 510 includes a compressible fluid 530, an incompressible fluid 520 and at least one meniscus 540 which forms a gas/liquid interface in the channel 510. The meniscus moves due to, but not limited to, pressure change, temperature change, or acceleration. The pressure sensor 500 also includes a device 580 for measuring a displacement of the gas/liquid interface. The device can be an electrode or a non-electrical mechanism to measure displacement of the interface.

In one embodiment, the pressure sensor 500 includes a plurality of channels within the substrate 550. Each of the plurality of channels is in fluid communication with the fluid port and each of the plurality of channels includes a compressible fluid, an incompressible fluid and at least one meniscus which forms a gas/liquid interface in each of the plurality of channels. The plurality of channels can include branching or bifurcating channels. Further, the pressure sensor 500 can include a temperature sensor in coordination with pressure sensor 500 to more accurately determine the pressure of the meniscus 540.

Experimental Results
Meniscus Pressure Results Using Four Silicon and Glass Microchannels A pressure sensor device, in accordance with one embodiment of the present invention, was fabricated with four microchannels made from silicon and glass. The device is shown in FIG. 6. The first microchannel is 80 µm in width; the second microchannel is 40 µm in width; the third microchannel is 20 µm in width; the fourth microchannel is 10 µm in width. The microchannels are approximately 20 µm deep and approximately 3.8 mm in total length. Water was introduced at approximately 761 Torr. Meniscus distance and pressure measurements of each microchannel were taken and compared to a predicted pressure. Demonstrated error sensitivities of less than about 1% were shown using microchannels of these sizes. The results are provided in the table below:

| Channel | Meniscus Distance | Measured Pressure | Predicted Pressure | Error (%) |
| --- | --- | --- | --- | --- |
| 80 µm | 115.38 µm | 23.83 torr | 23.73 torr | 0.42 |
| 40 µm | 137.11 µm | 28.28 torr | 28.48 torr | 0.7 |
| 20 µm | 185.29 µm | 38.45 torr | 37.97 torr | 1.26 |
| 10 µm | 268.63 µm | 56.76 torr | 56.96 torr | 0.35 |

Electrodes for Capacitance Measurements

A pressure sensor device having a single microchannel was made from silicon and glass. The device is similar in design to FIG. 5. The microchannel is approximately 20 µm deep and approximately 100 µm wide. Four 10 µm wide electrodes were positioned along the length of the microchannel with the anticipated goal of measuring a capacitance change as the liquid moved down the length of the microchannel.

Oil was introduced at 761 torr. Oil was used because it is dielectric in nature and unlikely to evaporate, making it a better choice for a proof of concept liquid than water or another aqueous solution.

The device was primed with oil and demonstrated displacement with pressure change. The meniscus moved into the microchannel with positive external pressure. And, as expected, the meniscus retreated with decreasing pressure. Average displacement was 18 µm/torr. FIG. 7 shows capacitive measurements taken by two of the four electrodes of the meniscus location for increasing and decreasing ambient pressures.

FIG. 8A shows the results for ambient pressure (torr) of increasing and decreasing ambient pressures at different meniscus locations from the entrance of the microchannel using optical methods to correlate with electrode measurements taken simultaneously.

FIG. 8B shows electrode capacitance measurements at increasing and decreasing ambient pressures using two of the four electrodes. As shown in the FIG. 8B, capacitance generally behaves as expected with an average change of −0.111 pF/torr.

Deviations from theory were likely due to two causes: 1. Heating from the light source (temperature effects) and 2. Van der Waal's forces (can be accounted for).

Experimental Conclusions
Capability to Prime a Single Port Device

All of the devices in the above experiments used a single entry port, although the invention is not limited in all embodiments to a single fluid port. In most cases, capillary forces were primed at atmosphere, but other testing was done with different "prime" pressures that provided different performance.

Self-Calibration Capillary Pressure Mechanism

Geometric solutions demonstrated errors of approximately 1% in prototype pressure sensor devices using water.

Electronic Readout

A sensor was demonstrated that showed an average change of capacitance of −0.111 pF/torr, demonstrating electronic determination of the pressure.

The present invention has many potential market applications. These include, but are not limited to, the following:
   i. the development of intracranial pressure (ICP) sensors that can be implanted in head trauma victims and operate for 5+ year lifetime. ii. Adapted for extreme environments such as deep-bore drilling to facilitate off-shore oil and natural gas extraction by improving sensitivities to prevent accidents. iii. Tire pressure monitoring.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A pressure sensor comprising:
   a. a substrate;
   b. a fluid port coupled to the substrate;
   c. a first microchannel within the substrate in fluid communication with the fluid port, wherein the first microchannel includes a first compressible fluid, a first incompressible fluid and at least one first meniscus; and
   d. a second microchannel within the substrate in fluid communication with the fluid port, wherein the second microchannel includes a second compressible fluid, a second incompressible fluid and at least one second meniscus; wherein a pressure of at least one of the first meniscus and the second meniscus is determined.

2. The pressure sensor of claim 1 wherein a cross-sectional dimension of the microchannels does not exceed 200 micrometers.

3. The pressure sensor of claim 1 wherein the microchannels differ in at least one of a cross-sectional area and length that allow for determination of meniscus pressure.

4. The pressure sensor of claim 3 wherein the width of the first microchannel is approximately half its height and the width of the second microchannel is approximately twice its height.

5. The pressure sensor of claim 1 further comprising an electrode.

6. The pressure sensor of claim 5 wherein the electrode is implemented in a capacitive, inductive or resistive fashion to determine the displacement of a gas/liquid interface.

7. The pressure sensor of claim 5 wherein the electrode is an analog electrode or a digital electrode.

8. The pressure sensor of claim 5 wherein the electrode measures a volume of gas in each of the microchannels.

9. The pressure sensor of claim 1 further comprising a non-electrical mechanism to measurement displacement of a gas/liquid interface selected from the group consisting of optical, acoustic or vibratory.

10. The pressure sensor of claim 1 wherein the sensor is embedded in one of the following: a cerebrospinal fluid (CSF), a deep well, an automotive tire, and a component of a MEMS device.

11. The pressure sensor of claim 1 further comprising a plurality of microchannels with the substrate, wherein each of the plurality of microchannels is in fluid communication with the fluid port and wherein the plurality of microchannels differ in at least one of a cross-sectional area and channel length.

12. The pressure sensor of claim 11 wherein the plurality of microchannels comprise branching or bifurcating microchannels.

13. The pressure sensor of claim 11 wherein each of the plurality of microchannels has at least one meniscus at a gas/liquid interface, and wherein a pressure of the at least one meniscus of the plurality of microchannels is determined.

14. The pressure sensor of claim 1 further comprising a temperature sensor in coordination with the pressure sensor to more accurately determine the pressure of at least one of the first and second meniscus.

15. The pressure sensor of claim 1 wherein the sensor is primed with any fluids at any pressure to operate in a variety of atmospheric conditions.

16. A method of sensing pressure comprising:
   a. providing a substrate;
   b. coupling a fluid port to the substrate;
   c. forming a first microchannel within the substrate, wherein the first microchannel is in fluid communication with the fluid port and includes a first compressible fluid, a first incompressible fluid and at least one first meniscus;
   d. forming a second microchannel within the substrate, wherein the second microchannel is in fluid communication with the fluid port and includes a second compressible fluid, a second incompressible fluid at least one second meniscus; and
   e. determining a pressure of at least one of the first meniscus and the second meniscus.

17. The method of claim 16 wherein a cross-sectional dimension of the microchannels does not exceed 200 micrometers.

18. The method of claim 16 wherein the microchannels differ in at least one of a cross-sectional area and length that allow for determination of meniscus pressure.

19. The method of claim 18 wherein the width of the first microchannel is approximately half its height and the width of the second microchannel is approximately twice its height.

20. The method of claim 16 further comprising providing an electrode.

21. The method of claim 20 wherein the electrode is implemented in a capacitive, inductive or resistive fashion to determine the displacement of a gas/liquid interface.

22. The method of claim 20 wherein the electrode is an analog electrode or a digital electrode.

23. The method of claim 20 wherein the electrode measures a volume of gas in each of the microchannels.

24. The method of claim 16 further comprising providing a non-electrical mechanism to measure displacement of a gas/liquid interface selected from the group consisting of optical, acoustic or vibratory.

25. The method of claim 16 further comprising forming a plurality of microchannels within the substrate, wherein each of the plurality of microchannels is in fluid communication with the fluid port and wherein the plurality of microchannels differ in at least one of a cross-sectional area and channel length.

26. The method of claim 25 wherein the plurality of microchannels comprise branching or bifurcating microchannels.

27. The method of claim 25 wherein each of the plurality of microchannels least one meniscus at a gas/liquid interface, and wherein a pressure of the at least one meniscus of the plurality of microchannels is determined.

28. A pressure sensor comprising:
   a. a substrate;
   b. a fluid port coupled to the substrate;
   c. a channel within the substrate in fluid communication with the fluid port, wherein the channel includes a compressible fluid, an incompressible fluid and at least one meniscus which forms a gas/liquid interface in the channel; and
   d. a device for measuring a displacement of the interface.

29. The pressure sensor of claim 28 wherein the device is an electrode.

30. The pressure sensor of claim 29 wherein the electrode is implemented in a capacitive, inductive or resistive fashion to determine the displacement of a gas/liquid interface.

31. The pressure sensor of claim 29 wherein the electrode is an analog electrode or a digital electrode.

32. The pressure sensor of claim 28 wherein the device is a non-electrical mechanism to measure displacement of the interface selected from the group consisting of optical, acoustic or vibratory.

33. The pressure sensor of claim 28 wherein the meniscus moves for at least one of the following reasons: pressure change, temperature change, and acceleration.

34. The pressure sensor of claim 28 further comprising a plurality of channels within the substrate, wherein each of the plurality of channels is in fluid communication with the fluid port and wherein each of the plurality of channels includes a compressible fluid, an incompressible fluid and at least one meniscus which forms a gas/liquid interface in each of the plurality of channels.

35. The pressure sensor of claim 34 wherein the plurality of channels comprise branching or bifurcating channels.

36. The pressure sensor of claim 28 further comprising a temperature sensor in coordination with the pressure sensor to more accurately determine the pressure of the meniscus.

37. The pressure sensor of claim 28 wherein the sensor is primed with any fluid at any pressure to operate in a variety of atmospheric conditions.

38. A method of sensing pressure comprising:
   a. providing a substrate;
   b. coupling a fluid port to the substrate;
   c. forming a channel within the substrate, wherein the channel is in fluid communication with the fluid port and wherein the channel includes a compressible fluid, an incompressible fluid and at least one meniscus which forms a gas/liquid interface in the channel; and
   d. measuring a displacement of the interface.

39. The method of claim 38 further comprising forming a plurality of channels within the substrate, wherein each of the plurality of channels is in fluid communication with the fluid port and wherein each of the plurality of channels includes a compressible fluid, an incompressible fluid and at least one meniscus which forms a gas/liquid interface in each of the plurality of channels.

40. The method of claim 39 wherein the plurality of channels comprise branching or bifurcating channels.

41. The method of claim 38 wherein the meniscus moves for at least one of the following reasons: pressure change, temperature change, and acceleration.

42. The method of claim 38 further comprising providing an electrode for measuring the displacement of the interface.

43. The method of claim 42 wherein the electrode is implemented in a capacitive, inductive or resistive fashion to determine the displacement of a gas/liquid interface.

44. The method of claim 42 wherein the electrode is an analog electrode or a digital electrode.

45. The method of claim 38 further comprising providing a non-electrical mechanism to measure the displacement of the interface selected from the group consisting of optical, acoustic or vibratory.

46. The method of claim 38 wherein the meniscus moves for at least one of the following reasons: pressure change, temperature change, and acceleration.

\* \* \* \* \*